United States Patent [19]

Cho et al.

[11] Patent Number: 5,247,353
[45] Date of Patent: Sep. 21, 1993

[54] MOTION DETECTION SYSTEM FOR HIGH DEFINITION TELEVISION RECEIVER

[75] Inventors: Hyun-Duk Cho, Pusan; Woi-Soo Park, Suwon; Jong-Hwa Lee; Hae-Mook Jung, both of Seoul, all of Rep. of Korea

[73] Assignee: SamSung Co., Ltd., Suwon, Rep. of Korea

[21] Appl. No.: 428,970

[22] Filed: Oct. 30, 1989

[51] Int. Cl.$^5$ .............................................. H04N 7/18
[52] U.S. Cl. ...................................... 358/105; 358/136
[58] Field of Search ............... 358/105, 133, 135, 136, 358/138, 21 R, 31, 160

[56] References Cited

U.S. PATENT DOCUMENTS

| | | |
|---|---|---|
| 4,307,420 | 12/1981 | Ninomiya et al. . |
| 4,639,767 | 1/1987 | Suzuki .................. 358/105 |
| 4,688,084 | 8/1987 | Achiha .................. 358/37 |
| 4,691,230 | 9/1987 | Kaneko et al. . |
| 4,692,801 | 9/1987 | Ninomiya et al. .......... 358/135 |
| 4,731,651 | 3/1988 | Matsumoto et al. . |
| 4,736,252 | 4/1988 | Nakagawa et al. ......... 358/105 |
| 4,745,459 | 5/1988 | Ninomiya et al. .......... 358/12 |
| 4,805,017 | 2/1989 | Kaneko et al. ............ 358/135 |
| 4,891,699 | 1/1990 | Hamada et al. ........... 358/105 |
| 4,912,556 | 3/1990 | Hirauchi et al. .......... 358/138 |

Primary Examiner—James J. Groody
Assistant Examiner—Michael H. Lee
Attorney, Agent, or Firm—Robert E. Bushnell

[57] ABSTRACT

A motion area detector capable of simple detection of a moving picture-area in a HDTV receiver of a multiple subsampling transmission system is disclosed. The motion area detector includes a still-picture processor for reproducing a still picture from a picture signal applied into the detection circuit of the receiver, a moving-picture processor for reproducing a moving picture from the picture signal, a mixer for carrying out a linear mixing operation between the still picture and the moving picture, and a motion detector for detecting a motion area from a mixed picture signal of the mixer and from the still picture signal reproduced by the still picture processor and for providing information concerning a mixing ratio between the still picture and the moving picture.

25 Claims, 4 Drawing Sheets

MOTION DETECTION SYSTEM FOR HIGH DEFINITION TELEVISION RECEIVER

BACKGROUND OF THE INVENTION

1. Field of the Invention

The present invention relates to a circuit for detecting motion of pictures in HDTV (High Definition Television) receiver, and in more particular to a motion detection circuit for use in the HDTV receiver for receiving a bandwidth compressed television transmission signal.

2. Description of the Prior Art

A multiple subsampling transmission system that achieves interframes and interfields offset subsampling, is one of various methods to transmit a television signal, that is, HDTV picture signal by bandwidth compression. An embodiment of such a transmission system is called MUSE (Multiple Sub-Nyquist Sampling Encoding) system, which performs effective bandwidth compression in transmission of television picture signals.

The multiple subsampling transmission system conventionally includes means for processing a still picture-area (portions of a field where the picture is still), means for processing a moving picture-area, a motion detector for detecting motion information from a difference signal of adjacent interframes, a mixer for mixing the moving picture with the still picture in accordance with a motion amount detected from the motion detector, and means for interframe offset sampling a signal from the mixer.

Further, the means for processing the still picture-area generally includes an interfield prefilter for removing high-frequency components in an oblique direction of a picture signal with a 24 MHz bandwidth limitation, a sampling circuit for receiving a signal from the interfield prefilter and for performing interfield offset subsampling in the 24 MHz sampling frequency, and a sampling frequency converter for changing only the sampling frequency from 24 MHz to 32 MHz.

Furthermore, the means for processing the moving picture-area generally includes an intrafield prefilter for limiting in 12 MHz a frequency bandwidth of the picture signal with the above-described bandwidth limitation and for removing the high-frequency components in the oblique direction, so as to prevent occurrence of aliasing, a sampling circuit for sampling an output of the intrafield prefilter in the 24 MHz sampling frequency, and a sampling frequency converter for changing only the sampling frequency from 24 MHz to 32 MHz.

The moving and still pictures, are each output by their respective processing means, are mixed together in linear mode by the mixer, according to an amount of motion detected by the motion detector. To an output of the mixer, the interframe offset subsampling is taken at 16 MHz sampling frequency by the interframe offset subsampling means, so that the moving picture signal would not have any aliasing portions in the 0 to 4 MHz frequency band. Along with various control signals necessary to reconstruct the original picture in a receiving end, for motion vector to compensate a movement of picture that may result from movement or tilting of a camera, the subsampling signal is transmitted in a 8 MHz base band for example.

FIG. 1 is a block diagram illustrating a portion of a decoder in a receiving end of the above-described system. A picture signal separated from a multiple subsampling transmission signal delivered from a transmitting end, is applied to an input terminal 10. An interframe interpolation filter 13, a sampling frequency converter 14 and an interfield interpolation filter 15 constitute a still picture processor 12 for reproducing a still picture portion out of the picture signal received. Here, by replacing a picture element not sampled by the interframe offset subsampling with a picture element of a preceding frame, the interframe interpolation filter 13 processes the still picture. The sampling frequency converter 14 converts a frequency of the interpolated output of the interframe interpolation filter 13 to the 24 MHz sampling frequency from the former 32 MHz frequency. In order to obtain a still picture with a 24-MHz signal band without aliasing, the interfield interpolation filter 15 is adopted. In addition, the interframe interpolation filter 13 and the interfield interpolation filter 15 serve to compensate for a motion of the picture resulting from a panning phenomena such as movement or tilting of the camera, in response to a motion vector provided from a separator (not shown in the drawing).

An intrafield interpolation filter 17 and a sampling frequency converter 18 constitute a moving picture processor 16 for reproducing a moving picture portion out of the picture signal received. The intrafield interpolation filter 17 is used to reproduce a moving picture signal without aliasing in a 0 to 12 MHz frequency band, from a moving picture signal aliased in 4 to 8 MHz frequency band. The sampling frequency converter 18 changes a frequency of the reproduced moving picture signal to the 24-MHz sampling frequency from 32-MHz signal.

A motion detector 20 limits a bandwidth of and the input signal up to 4 MHz to obtain an adjacent interframe difference signal, that is, an amount of motion from the moving picture signal. The still picture of the still picture processing means 12 and the moving picture of the moving picture processing means 16 are mixed together in a linear mode at a mixer 22, according to the amount of motion delivered from the motion detector 20, and thereafter applied to a Time Compressed Integration (TCI) decoder, not shown in the drawing.

U.S. Pat. No. 4,692,801, which was issued on 8 Sep. 1987, discloses the aforesaid system (MUSE II).

A method of detection of a motion area in the receiver of the aforesaid system is, to obtain an adjacent interframe difference signal from a moving picture signal of the picture signal received and then carry out the linear mixing operation of the still picture and the moving picture according to an amount of motion of said interframe difference signal.

In the meanwhile, referring to another MUSE system (see U.S. Pat. No. 4,745,459) including a frame memory and a temporal interpolator as a so-called still picture processing means, further having a spatial interpolator as a so-called moving picture processor, the motion detector achieves detection of such a motion area owing to a difference signal of two adjacent interframes.

Hence, the above-described prior art system generally has a problem owing to complication of detection of the motion area. Moreover, the complication of its circuit construction in the receiver will make it difficult to achieve economy its cost.

SUMMARY OF THE INVENTION

It is therefore an object of the present invention to provide a motion area detector capable of simple detection of a motion picture-area in a HDTV receiver of a multiple subsampling transmission system.

It is another object of the present invention to provide a motion area detector capable of greatly eliminating the complication of detection of the motion picture-area in the HDTV receiver.

It is still another object of the present invention to provide a motion area detector capable of achieving economy in the cost of manufacturing a HDTV receiver.

To achieve the foregoing objects and other various advantages of the invention, there is provided a detection circuit for motion area including a still picture processing means for reproducing a still picture from a picture signal received into the detection circuit in a receiver of a multiple subsampling transmission system, a moving picture processing means for reproducing a moving picture from the picture signal received thereto, a mixer for carrying out a linear mixing operation between the still picture and the moving picture, and a motion detector for detecting a motion area from a mixed picture signal of the mixer and from the still picture signal reproduced at the still picture processing means and for providing information of a mixing ratio between the still picture and the moving picture.

The motion detector further includes a frame memory for storing the picture signal of the mixer, a stage for computing an absolute value of the difference between the picture signal stored in the frame memory and the still picture signal, and a smoothing circuit for making smooth a boundary line of the motion area and for removing spot errors therein.

BRIEF DESCRIPTION OF THE DRAWINGS

For a better understanding of the invention and to show how the same may be carried into effect, reference will now be made, by way of example, to the accompanying diagrammatic drawings, wherein.

DETAILED DESCRIPTION OF THE PREFERRED EMBODIMENT

Figure 1:
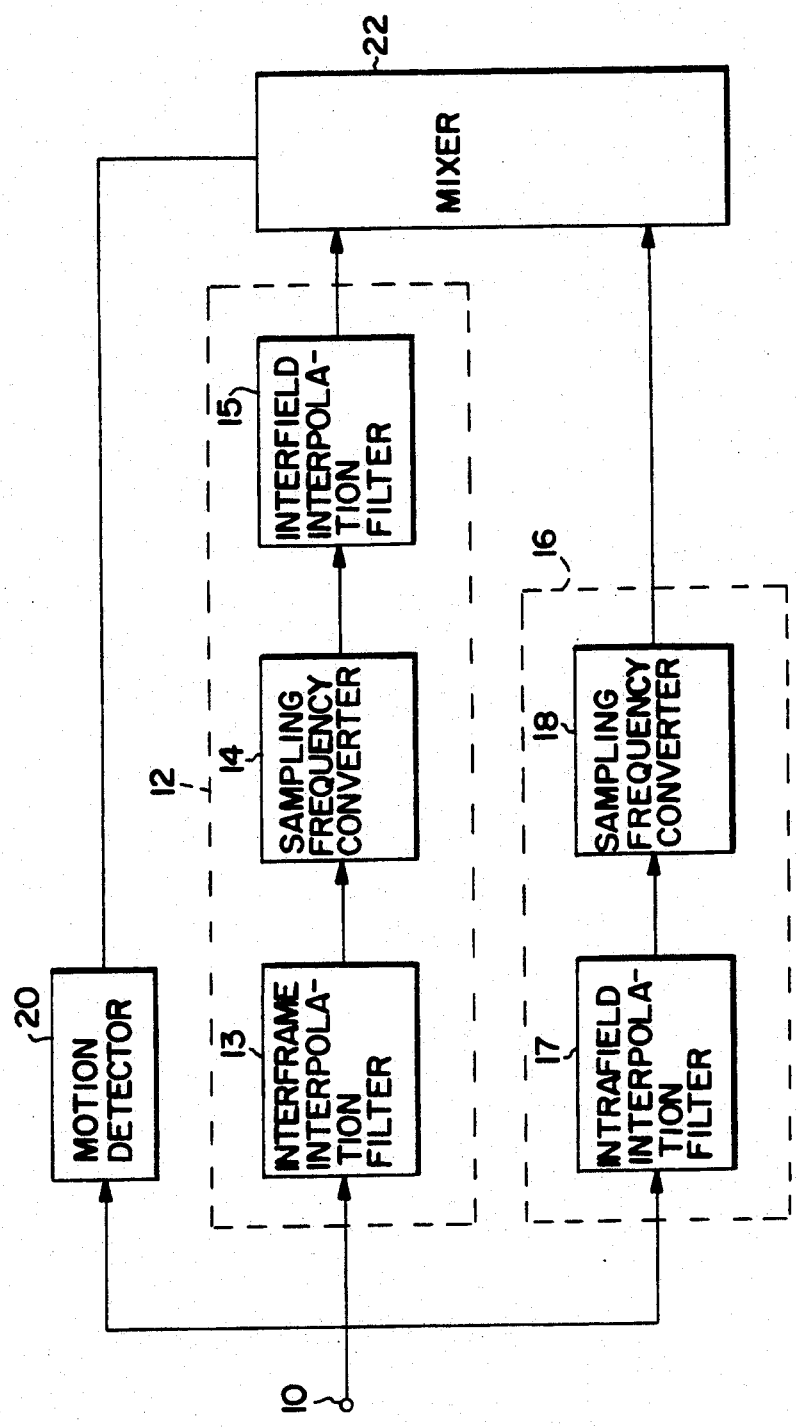
FIG. 1 is a block diagram showing a motion detection circuit in a prior-art HDTV receiver.

The above and other objects, effects and features of the present invention will become more apparent from the following description of preferred embodiments thereof taken in conjunction with the accompanying drawings. The same reference numerals are used to designate similar parts throughout the figures.

Figure 2:
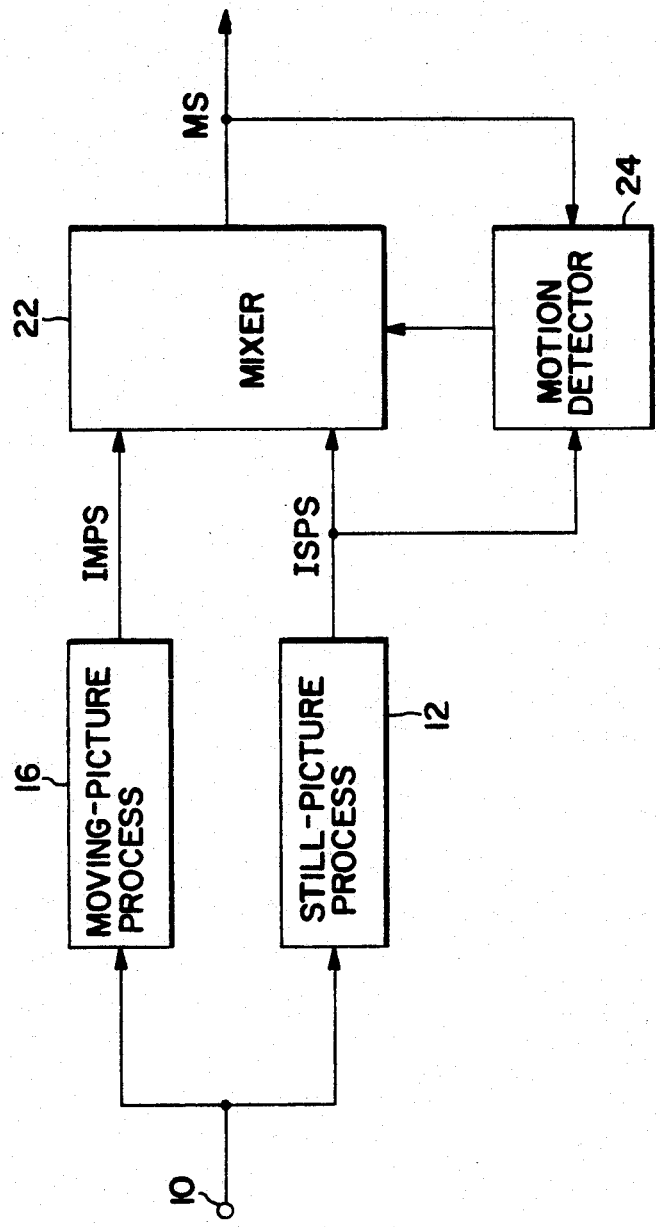
FIG. 2 is a block diagram showing a preferred embodiment of a motion detection circuit according to the present invention.

Referring to FIG. 2, a moving-picture processor 16 and a still-picture processor 12, in the same way as those described above with reference to the FIG. 1 system, provide respectively an intrafield interpolated, moving-picture signal IMPS and an interframe and interfield interpolated, still-picture signal ISPS, in response to a picture signal received in an input terminal 10. The signal ISPS from the still-picture processing means 12 will be a signal interpolated by two frames as well as an interfield. Hence, when a movement of picture occurs in two successive frames by movement of an object, the still-picture signal ISPS includes a motion area of the picture signal received.

Both the signals ISPS and IMPS are mixed together in a linear mode by a mixer 22 according to a motion detection signal from a motion detector 24, so that an original picture signal corresponding to a picture signal of the last one of the two successive frames can be obtained by the mixer 22. Therefore, in accordance with the characteristic of the present invention, the motion detector 24 detects a motion area from the picture signal obtained in the preceding frame by the mixer and from the picture signal including a motion area obtained by the interframe interpolation between the current frame of the still-picture processing means 12 and its preceding frame, and thereby provides a motion detection signal with an appropriate value for picture elements located within the detected motion area.

Figure 3:
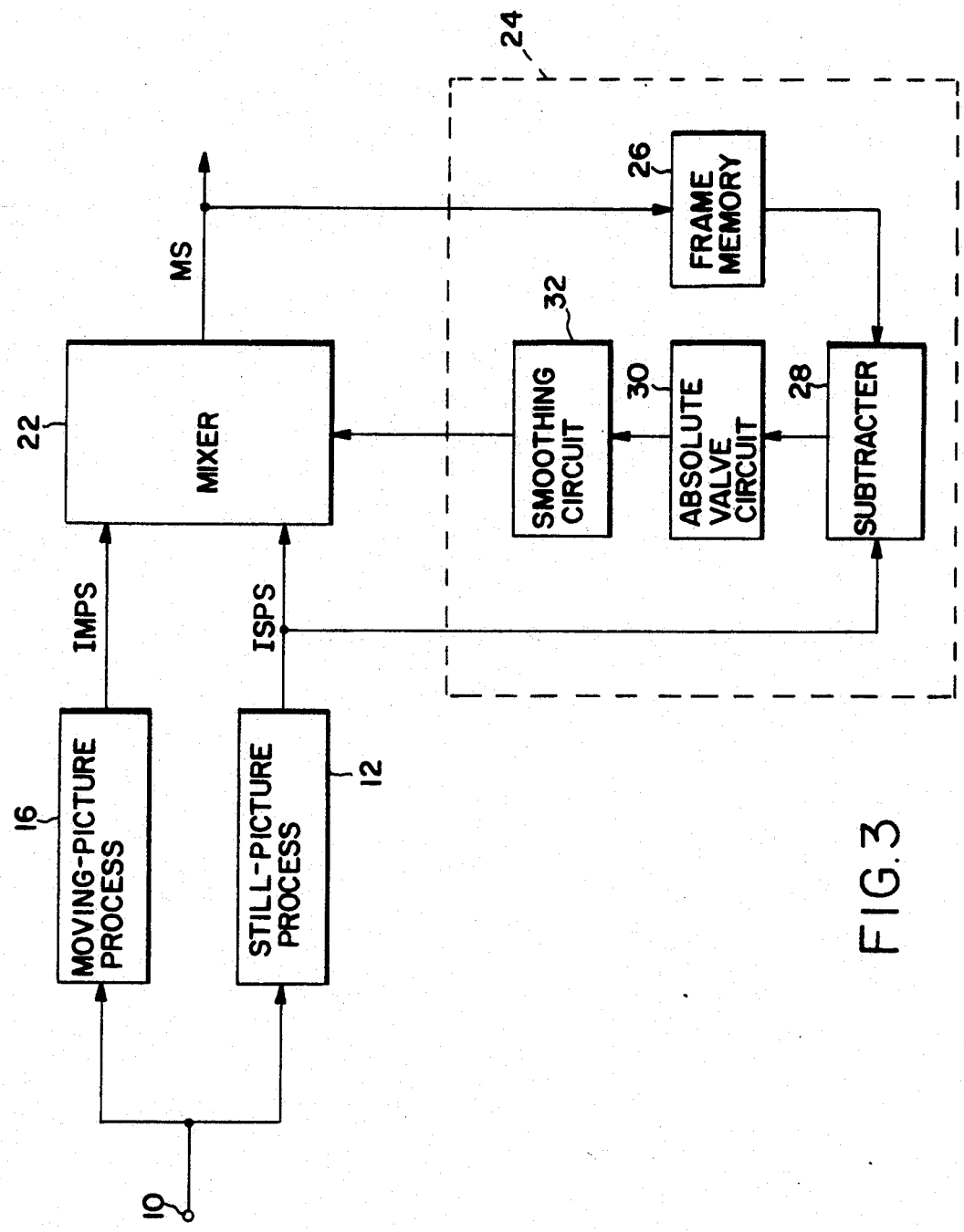
FIG. 3 is a block diagram showing in more detail a motion detector portion in FIG. 2.

FIG. 3 shows a detailed block diagram of the motion detector 24, in which a frame memory 26 stores the output of the mixer 22. A subtracter 28 provides a difference signal between picture elements of the picture signal obtained in a preceding frame stored in the frame memory 26 and picture elements of the picture signal including the motion area obtained through the interframe interpolation between the current frame of the still-picture processing means 12 and its preceding frame.

An absolute value circuit 30 converts the difference signal between the respective picture elements of the subtracter 28 into an absolute value. Therefore, an output of the absolute value circuit 30 is zero for picture elements corresponding to the still area of the picture signal from the still-picture processing means 12, while it has a certain value for picture elements corresponding to the motion area of the picture signal. As a result, the output of the absolute value circuit 30 will be a value detecting the motion area. However, due to aliasing in the motion area, spot errors may occur in the detected motion area, thereby resulting in an uneven boundary line of the motion area. To eliminate the spot error and smooth the boundary of the motion area, a smoothing circuit 32 is employed. A known intermediate value filter or mean value filter, which takes an intermediate value of three values applied from the absolute value circuit 30 against two picture elements adjacent to a particular picture element, may be employed as the smoothing circuit 32. Though there may be used an intermediate value filter taking an intermediate value of five values if necessary, the known intermediate value filter for three values will be preferable to avoid complication of its circuit construction.

Assuming that a number of bits provided from the smoothing circuit 32 is "n" and an output value of the same smoothing circuit, that is, a detection value of the motion area is "M", a mixing ratio alpha ($\alpha$) of the mixer 22 will be expressed in a following formula:

$$\alpha = M/(2^n - 1) \tag{1}$$

In addition, an output signal MS from the mixer will be taken in the following formula:

$$MS = \alpha \cdot IMPS + (1 - \alpha) \cdot ISPS \tag{2}$$

As understood from the above formula (2), the output of the mixer upon the still area of the picture signal is a picture signal of the still-picture processing means owing to the relationship $\alpha = 0$, and by applying an appropriate value of α to the motion area, reproduction of the original picture will be able to be achieved.

In general, a number of bits in the output of the smoothing circuit 32 is preferably four per picture element, which is to achieve simplification of the circuit in use. However, when the bit number of the output of the smoothing circuit 32 exceeds four, for example, if it is 8-bit or 16-bit, a bit converter for 4-bit converting operation may be used between the smoothing circuit and the mixer. The bit converter may be accomplished by using at least one Read Only Memory (ROM), wherein if taking a 8-bit device, the 4-bit output will be easily achieved by eliminating both the uppermost two bits and the lowermost two bits of the eight bits.

Figure 4A:
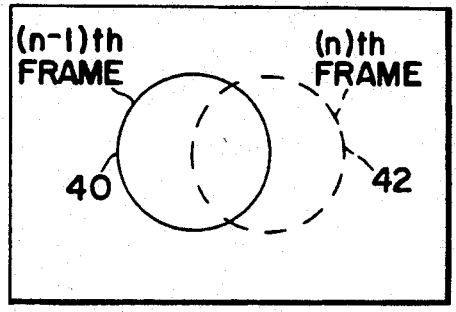
FIGS. 4A to 4D are schematic diagrams for describing the operation of the motion detection circuit according to the present invention.
Figure 4B:
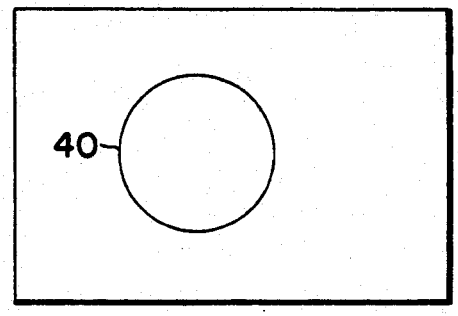
Figure 4C:
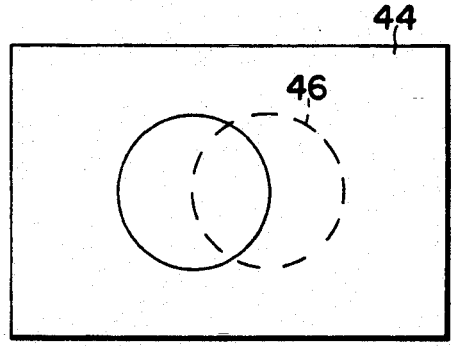
Figure 4D:
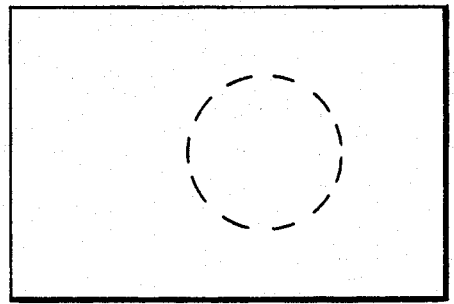

FIGS. 4A to 4D are schematic diagrams for giving easy understanding of the operation according to the inventive motion detection system, wherein FIG. 4A illustrates a case where a circle 40 at (n−1)th frame shifts to a dotted circle 42 at the (n)th frame. Now, it is assumed that the circle 40 was not moved up to the (n)th frame. Then, into the frame memory 26 of the motion detector 24 is stored a picture signal shown in FIG. 4B. Since the picture of FIG. 4B is a picture obtained by a still picture, it can be reproduced without any deterioration of picture quality, which is extremely close to its original picture. If a picture signal of the dotted circle 42 is transmitted at the (n)th frame, a still picture signal ISPS from the still-picture processing means 12 will be a still picture signal of FIG. 4C, obtained by interframe interpolation between the (n−1)th frame and the (n)th frame. As is well understood from FIG. 4C, the signal ISPS has both a signal for a still area 44 and a signal for a motion area 46. Since the moving area 46 of FIG. 4C is an area reproduced irrespectively of the interframe correlation, the picture quality of picture elements in the motion area 46 has deteriorated considerably. In the meantime, the moving picture signal IMPS from the moving-picture processing means 16 is a moving picture signal of FIG. 4D, obtained from the intrafield interpolation by a current frame, that is, the (n)th frame. Hence, the picture signal of FIG. 4B and the still picture signal of FIG. 4C stored into the frame memory 26 are processed at the subtractor 28, and an absolute value of a difference between the two picture signals is generated at the absolute value circuit 30. Accordingly, the output of the absolute value circuit 30 has a given value that is a detection value of its motion area upon the picture elements located in the motion area 46, while it is zero for other picture elements located in the still area 44. This will achieve the detection of a motion area according to the invention.

The operation of the smoothing circuit 32 and the mixer 22 to be continued subsequently, is all the same way as the aforementioned explanation.

As apparent from the aforementioned description of the invention, the motion detection system has the motion detector for detecting the motion area by an absolute value of a difference signal between the output of the mixer and the still picture signal of the still-picture processing means and also for providing a motion area detection signal to smooth boundary lines of the motion area as well as to eliminate spot errors therein, and the mixer for mixing the moving picture signal to the still picture signal under the control of the motion area detection signal, so that it enables easier detection of a motion area and simpler circuit construction, compared to prior motion detection systems.

The foregoing description shows only a preferred embodiment of the present invention. Various modifications are apparent to those skilled in the art without departing from the scope of the present invention which is only limited by the appended claims. Therefore, the embodiment shown and described is only illustrative, not restrictive.

What is claimed is:

1. A circuit for detecting motion of pictures from a picture signal of a multiple subsampling transmission system, comprising:
    means for reproducing a motion picture signal from said picture signal;
    means for reproducing a still picture signal from said picture signal;
    a mixer for carrying out a mixing process between said motion picture signal and said still picture signal in accordance with a given mixing ratio, to thereby produce a mixed picture signal; and
    motion detection means for providing a motion detection signal to decide said mixing ratio upon picture elements corresponding to a motion area of a picture from said mixed picture signal and said reproduced still picture signal.

2. The circuit as set forth in claim 1, wherein said motion detection means comprises:
    memory means for storing said mixed picture signal provided from said mixer;
    computing means for obtaining an absolute value of difference between said reproduced still picture signal and the picture signal stored in said memory; and
    smoothing means for providing the motion detection signal in response to said absolute value, to smooth said motion area.

3. The circuit as set forth in claim 2, wherein said smoothing means comprises at least one intermediate value filter.

4. The circuit as set forth in claim 2, further comprised of a bit converter connected between said smoothing means and said mixer.

5. A circuit for detecting motion of pictures from a picture signal, comprising:
    means for reproducing a motion picture signal from an input picture signal of a multiple subsampling transmission system;
    means for reproducing a still picture signal from said picture signal;
    means for mixing said motion picture signal and said still picture signal in accordance with a given mixing ratio, to thereby produce a mixed picture signal; and
    motion detection means for providing motion detection signals to determine said mixing ratio on the basis of picture elements corresponding to a motion area of a picture from said mixed picture signal and said still picture signal.

6. The circuit as set forth in claim 5, wherein said motion detection means comprises:
    memory means for storing said mixed picture signal produced by said mixer means;
    computing means for obtaining absolute values of differences between said reproducing still picture signal and the mixed picture signal stored in said memory means; and
    smoothing means for providing motion detection signals in response to said absolute values and for smoothing said motion area.

7. The circuit as set forth in claim 6, wherein said smoothing means comprises at least one intermediate value filter.

8. The circuit as set forth in claim 6, further comprises of a bit converter connected between said smoothing means and said mixing means.

9. The circuit of claim 5, wherein:
said still picture signal reproducing means generates said still picture signal by interframe interpolation between a current frame and a preceding frame; and
said motion detection means detects a motion area by operating upon a preceding frame of said mixed picture and said still picture signal.

10. The circuit of claim 5, wherein said motion detection means comprises:
means for generating differences signals between picture elements of a preceding frame of said mixed picture and picture elements of said still picture signal;
means for converting said differences signals into absolute values; and
means for smoothing boundaries of the motion area by operating upon said absolute values.

11. The circuit of claim 10, wherein said still picture signal reproducing means generates said still picture signal by interframe interpolation between current frames and preceding frames.

12. The circuit of claim 5, wherein said motion picture reproducing means comprises:
an intrafield interpolation filter coupled to receive said input picture signal and provide a first intermediate picture signal; and
a sampling frequency converter coupled to said intrafield interpolation filter to provide said motion picture signal by changing frequency of said first intermediate picture signal.

13. The circuit of claim 5, wherein said motion picture reproducing means comprises:
an intrafield interpolation filter coupled to receive said input picture signal and provide a first intermediate picture signal without aliasing in a zero to twelve megaHertz frequency band; and
a sampling frequency converter coupled to said intrafield interpolation filter to provide said motion picture signal by changing frequency of said first intermediate picture signal from thirty-two megaHertz to twenty-four megaHertz.

14. The circuit of claim 5, wherein said still picture reproducing means comprises:
an interframe interpolation filter coupled to receive said input picture signal and provide an interpolated picture signal;
a sampling frequency converter coupled to said interframe interpolation filter to provide an intermediate picture signal by changing frequency of said interpolated picture signal; and
an interfield interpolation filter coupled to said sampling frequency converter to provide said still picture signal by removing high frequency components of said intermediate picture signal.

15. The circuit of claim 12, wherein said still picture reproducing means comprises:
an interframe interpolation filter coupled to receive said input picture signal and provide an interpolated picture signal;
a sampling frequency converter coupled to said interframe interpolation filter to provide a second intermediate picture signal by changing frequency of said interpolated picture signal; and
an interfield interpolation filter coupled to said sampling frequency converter to provide said still picture signal by removing high frequency components of said second intermediate picture signal.

16. The circuit of claim 13, wherein said still picture reproducing means comprises:
an interframe interpolation filter coupled to receive said input picture signal and provide an interpolated picture signal;
a sampling frequency converter coupled to said interframe interpolation filter to provide a second intermediate picture signal by changing frequency of said interpolated picture signal; and
an interfield interpolation filter coupled to said sampling frequency converter to provide said still picture signal by removing high frequency components of said second intermediate picture signal.

17. The circuit of claim 10, wherein said motion picture reproducing means comprises:
an intrafield interpolation filter coupled to receive said input picture signal and provide a first interpolated picture signal; and
a sampling frequency converter coupled to said intrafield interpolation filter to provide said motion picture signal by changing frequency of said first intermediate picture signal.

18. The circuit of claim 17, wherein said still picture reproducing means comprises:
an interframe interpolation filter coupled to receive said input picture signal and provide an interpolated picture signal;
a sampling frequency converter coupled to said interframe interpolation filter to provide a second intermediate picture signal by changing frequency of said interpolated picture signal; and
an interfield interpolation filter coupled to said sampling frequency converter to provide said still picture signal by removing high frequency components of said second intermediate picture signal.

19. A process for detecting motion of pictures from a picture signal, comprising:
reproducing a still picture signal from said picture signal;
mixing said motion picture signal and said still picture signal in accordance with a given mixing ratio, to thereby produce a mixed picture signal; and
generating motion detection signals to determine said mixing ratio on the basis of picture elements corresponding to a motion area of a picture from said mixed picture signal and said still picture signal.

20. The process of claim 19, wherein said step of generating detection signals comprises:
generating difference signals between picture elements of a preceding frame of said mixed picture and picture elements of said still picture signal;
converting said difference signals into absolute values; and
smoothing boundaries of the motion area by operating upon said absolute values.

21. The process of claim 20, wherein said step of reproducing a motion picture comprises:
generating a first intermediate picture signal by subjecting said input picture signal to an intrafield interpolation; and
subjecting said first intermediate picture signal to sampling frequency conversion to provide said motion picture signal by changing the frequency of said first intermediate picture signal.

22. The process of claim 21, wherein said step of reproducing a still picture comprises:
   subjecting said input picture signal to interframe interpolation filtering to provide an interpolated picture signal;
   subjecting said interpolated picture signal to sampling frequency conversion to provide a second intermediate picture signal by changing the frequency of said interpolated picture signal; and
   subjecting said second intermediate picture signal to intrafield interpolation filtering to provide said still picture signal by removing high frequency components of said second intermediate picture signal.

23. A circuit for detecting motion of pictures, comprising:
   memory means for storing mixed picture signals resulting from a linear mixing of moving picture signals obtained from interfield picture signals and still picture signals;
   means for generating difference signals by obtaining absolute values of differences between picture elements of said a current frame of said still picture signals and picture elements of a preceding frame of said mixed picture signals stored by said memory means; and
   means, in response to reception of said difference signals, for smoothing boundaries of a motion area of said mixed pictures represented by said mixed picture signals by providing motion detection signals suggestive of mixing ratios between picture elements corresponding to said motion area and a still picture represented by said still picture signals.

24. The process of claim 19, wherein said step of reproducing a motion picture comprises:
   generating a first intermediate picture signal by subjecting said input picture signal to an intrafield interpolation; and
   subjecting said first intermediate picture signal to sampling frequency conversion to provide said motion picture signal by changing the frequency of said first intermediate picture signal.

25. The process of claim 19, wherein said step of reproducing a still picture comprises:
   subjecting said input picture signal to interframe interpolation filtering to provide an interpolated picture signal;
   subjecting said interpolated picture signal to sampling frequency conversion to provide a second intermediate picture signal by changing the frequency of said interpolated picture signal; and
   subjecting said second intermediate picture signal to interfield interpolation filtering to provide said still picture signal by removing high frequency components of said second intermediate picture signal.

* * * * *

UNITED STATES PATENT AND TRADEMARK OFFICE
CERTIFICATE OF CORRECTION

PATENT NO. : 5,247,353
DATED : 21 September 1993
INVENTOR(S) : Hyun-Duk Cho Page 1 of 2

It is certified that error appears in the above-identified patent and that said Letters Patent is hereby corrected as shown below:

Column 1,

Line 8,     after "in" insert --a--;

Line 51,     before "are mixed together" insert --and--;

Line 60,     replace "for" with --a--; and replace "a" with --for--;

Column 2,

Line 32,     replace "and the" with --an--;

Line 46,     delete comma;

Line 64,     replace "achieve economy" with --economize--;

Column 3,

Line 9,     replace "economy in the" with --an economical--;

Line 61,     replace "respectively" with --, respectively, --;

UNITED STATES PATENT AND TRADEMARK OFFICE
CERTIFICATE OF CORRECTION

PATENT NO. : 5,247,353
DATED : 21 September 1993
INVENTOR(S) : Hyun-Duk Cho

It is certified that error appears in the above-identified patent and that said Letters Patent is hereby corrected as shown below:

Column 8,

Line 44, after "comprising:" insert the following paragraph,

--reproducing a motion picture signal from an input picture signal of a multiple subsampling transmission system;--

Signed and Sealed this

Thirtieth Day of August, 1994

Attest:

BRUCE LEHMAN

Attesting Officer

Commissioner of Patents and Trademarks